Feb. 22, 1966 E. A. MORSE 3,236,238
SANITARY NAPKIN AND METHOD OF MAKING
Filed Jan. 30, 1963 5 Sheets-Sheet 1
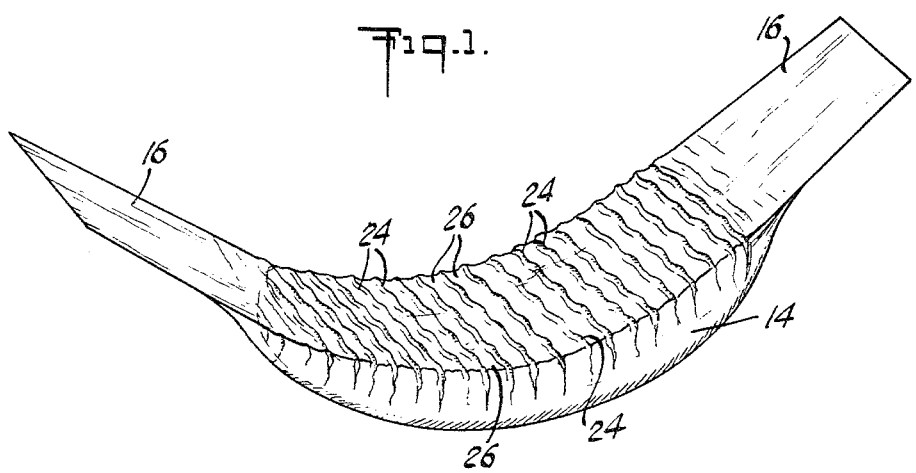
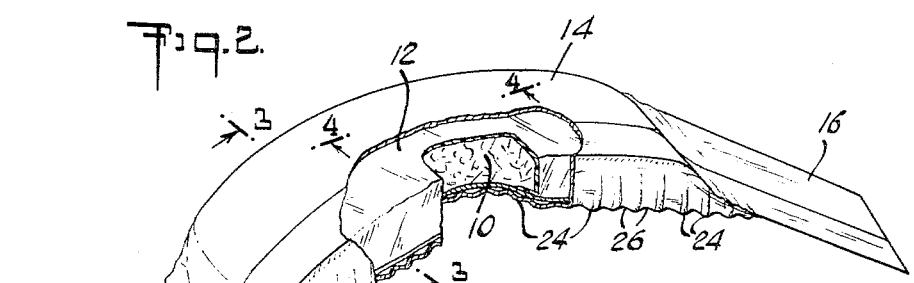
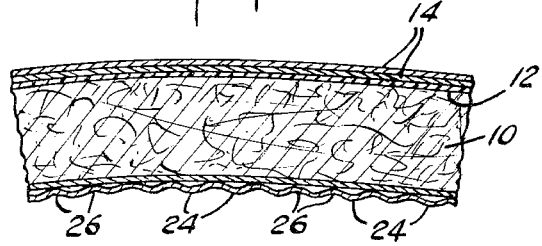
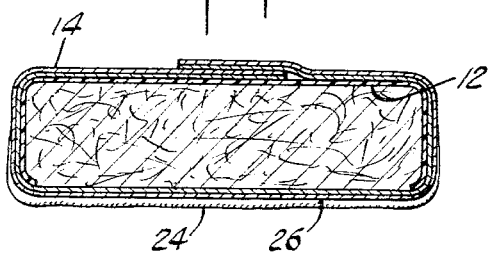
INVENTOR.
EDWARD A. MORSE
BY
ATTORNEY

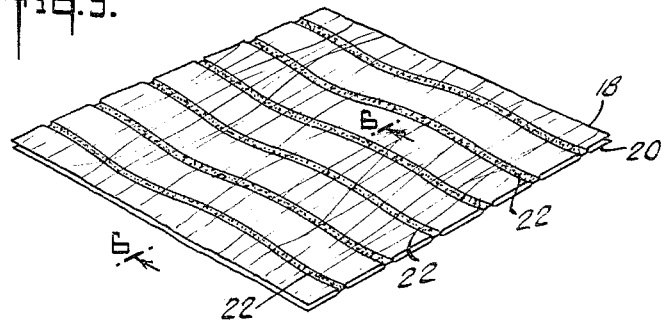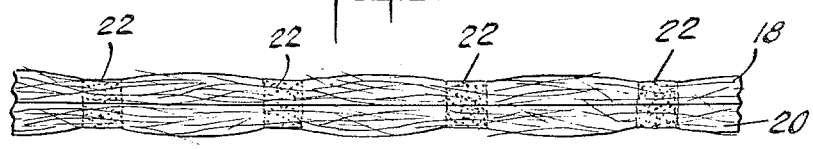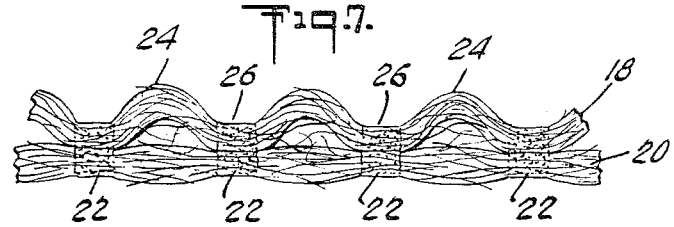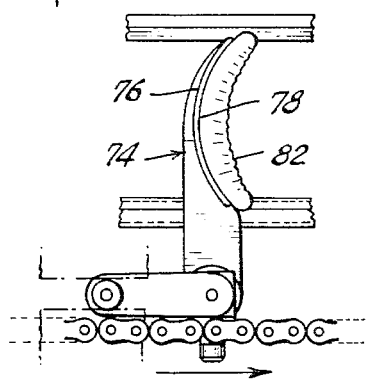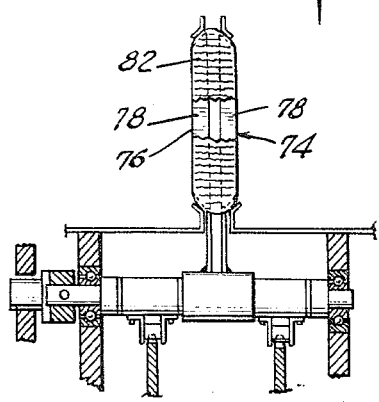

Feb. 22, 1966  E. A. MORSE  3,236,238
SANITARY NAPKIN AND METHOD OF MAKING
Filed Jan. 30, 1963  5 Sheets-Sheet 3

INVENTOR.
EDWARD A. MORSE
BY
John Bennor
ATTORNEY

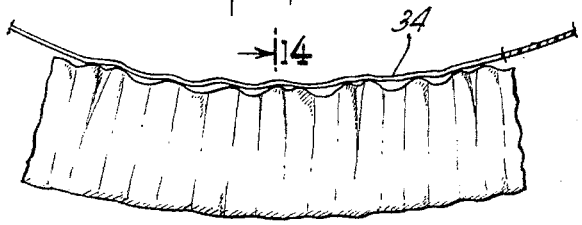
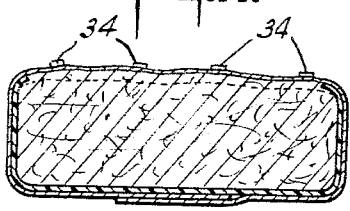
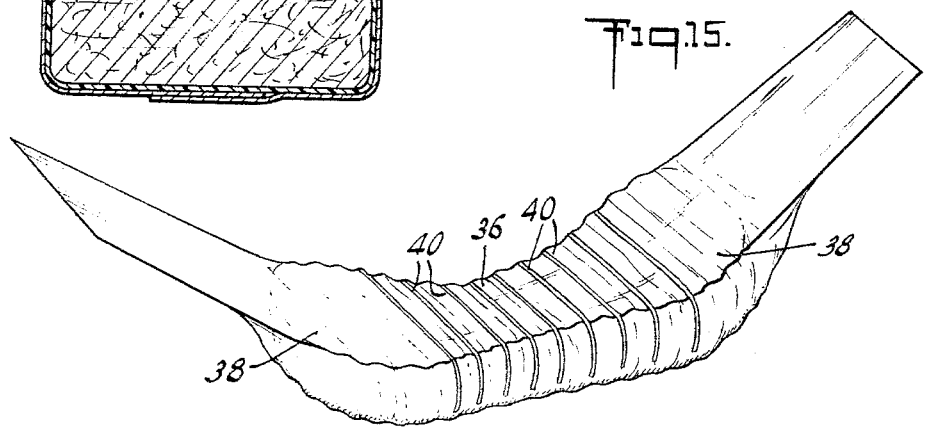
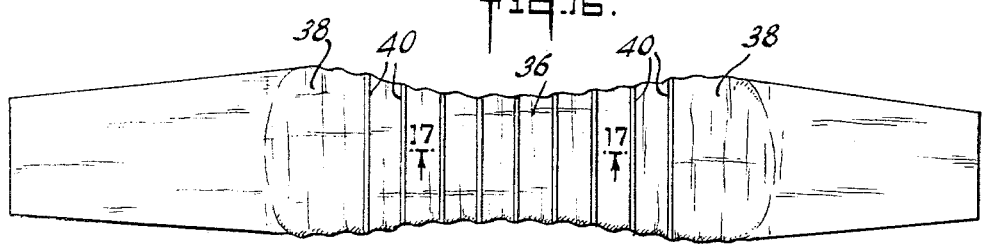
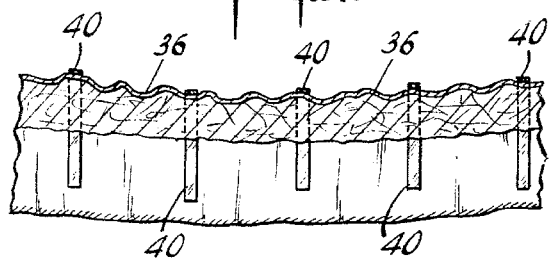

Feb. 22, 1966     E. A. MORSE     3,236,238
SANITARY NAPKIN AND METHOD OF MAKING
Filed Jan. 30, 1963     5 Sheets-Sheet 5
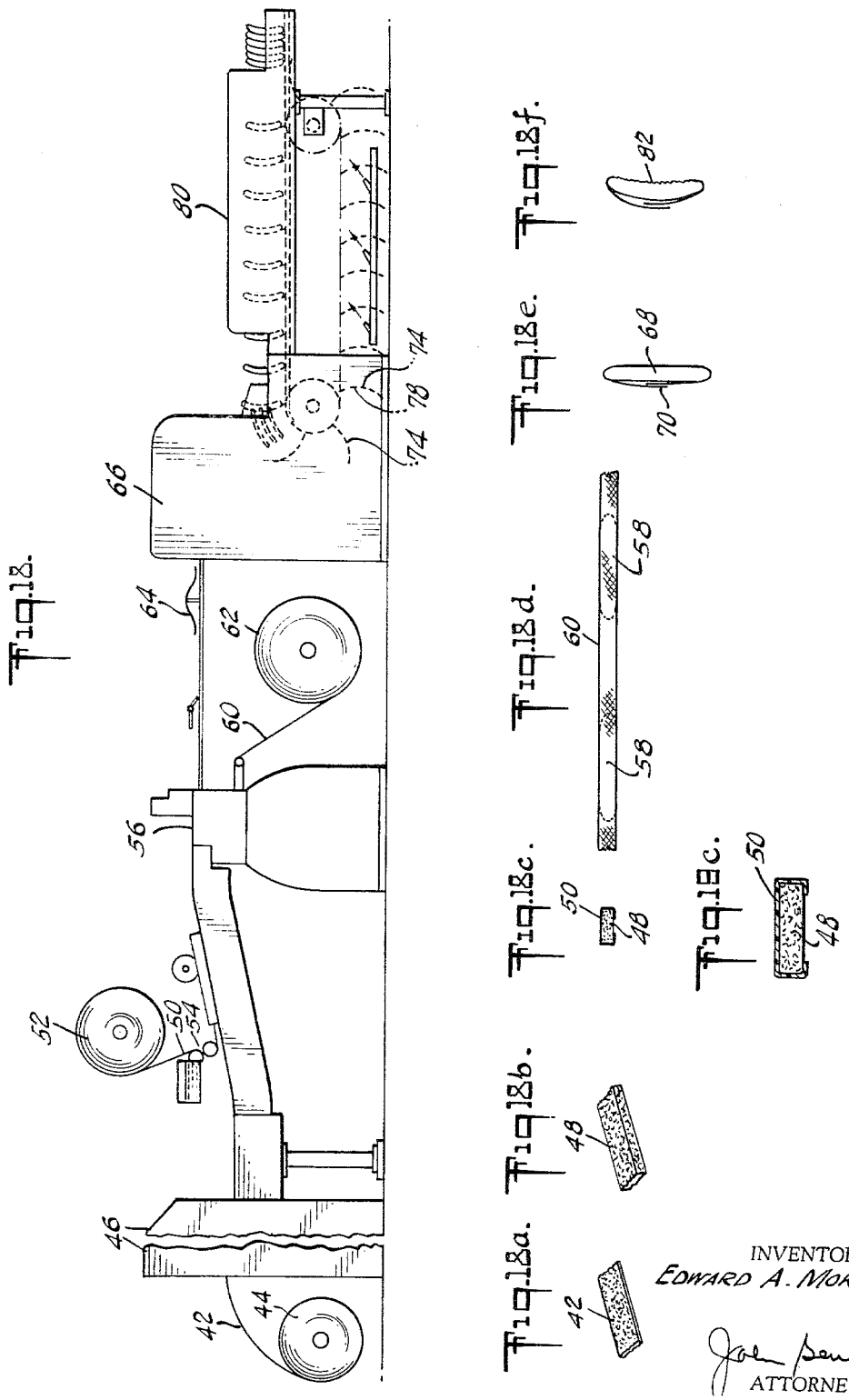
INVENTOR.
EDWARD A. MORSE
ATTORNEY United States Patent Office 3,236,238
Patented Feb. 22, 1966

1

3,236,238
SANITARY NAPKIN AND METHOD OF MAKING
Edward A. Morse, Fanwood, N.J., assignor to Johnson & Johnson, a corporation of New Jersey
Filed Jan. 30, 1963, Ser. No. 254,949
15 Claims. (Cl. 128—290)

This invention relates to preformed articles useful for absorbing or padding purposes, and to methods of making them, and more particularly to preformed non-planar articles containing fibrous material covered with a fabric.

In co-pending patent application Serial No. 223,488, "Product and Method of Making It," filed September 13, 1962, there are disclosed articles having a preformed non-planar configuration and containing fibrous material. Examples of such articles include sanitary napkins which are preformed into an arcuate configuration approximating the configuration of the part of the body against which they are placed when worn, lactation pads which are of a generally hemispherical shape, and similar non-planar articles which may be used for absorbing or padding purposes. The articles disclosed in the above referred to application may be made by securing to a surface of one or more layers of fibrous material, such as a pad of wood pulp fibers, rayon, cotton or similar materials of the type commonly used for absorbing and padding purposes, an axially-oriented plastic material in the form of a film, strands, filaments and the like. The axially-oriented plastic material has shrinkable properties which permits it to be shrunk to a smaller size. The non-planar configuration of the articles may be obtained by shrinking the plastic materials, or the articles may be maintained in such configuration by the materials.

In many of such articles, it is customary to cover the core or padding portion thereof with a fabric cover to confine and maintain the interior components of the articles in their desired relationship. For example, sanitary napkins customarily contain an absorbent core enclosed within a fabric cover which serves to hold and confine the absorbent core portion of the napkin in position and also to provide means for positioning the napkin on the body of the wearer. When the napkin is of a flat, rectangular configuration, the cover is easily wrapped about the absorbent core. However, if the napkin has a non-planar configuration, e.g., is arcuately shaped in the direction of its length, it is difficulty to wrap the fabric cover around the core to conform it to the shape of the core and into intimate contact with the core. Most fabric used as covers for such articles, particularly non-woven fabrics, do not have sufficient extensibility or elasticity to permit them to be so wrapped. Consequently, the fabric tends either to remain out of contact with the curved surface of the napkin, or to form ripples, creases and unsightly and uncomfortable bulges which not only detract from the appearance of the article, but which also often affect its functional characteristics. In the case of a sanitary napkin or similar article used for absorbing purposes, fluid which impinges upon the surface of the article will not be satisfactorily absorbed by the inner absorbent components of the article unless the cover is in contact with the components.

I have discovered that articles suitable for absorbing or padding purposes and having a non-planar configuration may be provided with a fabric cover, especially a non-woven fabric cover, which can be associated in conforming relationship with other components in the article by utilizing a fabric which has shrinkable characteristics. The fabric cover may be associated with the other components of the article and the cover then shrunk to cause the cover in the shrunken areas to assume smaller dimensions as desired.

2

By the term non-planar articles, I include articles which are non-planar in the direction of one or more of their axes. For example, an arcuately shaped sanitary napkin may be non-planar in the direction of its longitudinal axis, transversely thereof, or in both directions. The term also includes flat articles which have one or more peripheral portions, e.g., a side or an end, which is not straight. An example of such an article would be a diaper having an hour-glass shape. Thus, my invention is directed to essentially any irregularly shaped article or an article having an irregularly shaped portion.

Reference is made to the accompanying drawing and the following description wherein various embodiments of the invention are illustrated and described by way of example.

In the drawings:

FIG. 1 is a perspective view of a sanitary napkin incorporating the invention;

FIG. 2 is an inverted view of the sanitary napkin of FIG. 1;

FIG. 3 is a view of FIG. 2 taken along lines 3—3;

FIG. 4 is an enlarged view of the section of FIG. 2 taken along lines 4—4;

FIG. 5 is a schematic perspective view of a non-woven fabric which may be used in the practice of the invention and comprising a plurality of bonded fibrous webs prior to processing to provide the fabric cover;

FIG. 6 is an enlarged schematic cross-sectional view of FIG. 5 taken along lines 6—6;

FIG. 7 is an enlarged schematic cross-sectional view of the fibrous web of FIG. 5 after processing;

FIG. 8 is a side elevational view of preforming molds used in connection with apparatus illustrated in FIG. 18;

FIG. 9 is a right side view of FIG. 8;

FIG. 13 is an enlarged fragmentary side elevational view of the napkin of FIG. 12;

FIG. 14 is a view of FIG. 13 taken along lines 14—14;

FIG. 15 is a perspective view of a napkin embodying a still further form of the invention;

FIG. 16 is a top view of FIG. 15;

FIG. 17 is an enlarged, fragmentary side elevational view of FIG. 16;

FIG. 18 is a diagrammatic view of apparatus for making a non-planar body, such as a sanitary napkin, in accordance with the invention;

FIGS. 18a through FIG. 18f and 19c illustrate sequential steps in the making of a napkin on the apparatus of FIG. 18;

FIG. 18a is a fragmentary perspective view of a wood pulp board prior to comminuting to form a continuous fibrous bat from which pads which constitute absorbent components of the napkin are cut;

FIG. 18b is a fragmentary perspective view of the continuous absorbent fibrous bat formed from the wood pulp board of FIG. 18a;

FIG. 18c is a transverse sectional view of the bat of FIG. 18b covered on the top, sides and bottom longitudinal edge portions with an axially-oriented plastic film.

FIG. 19c is an enlarged view of FIG. 18c;

FIG. 18d is a fragmentary top view of a series of absorbent pads cut from the bat of FIG. 18b disposed in spaced relationship and enclosed within a continuous length of a cover fabric, such as a non-woven fabric, having shrinkable characteristics;

FIG. 18e is a view of individual napkins formed by cutting the cover of the covered pads of FIG. 18d between spaced pads to provide attachment tabs which are folded around the pads, and FIG. 18f is a side elevational view of an arcuately shaped napkin prepared from the napkin of FIG. 18e and incorporating the invention.

Figure 10:
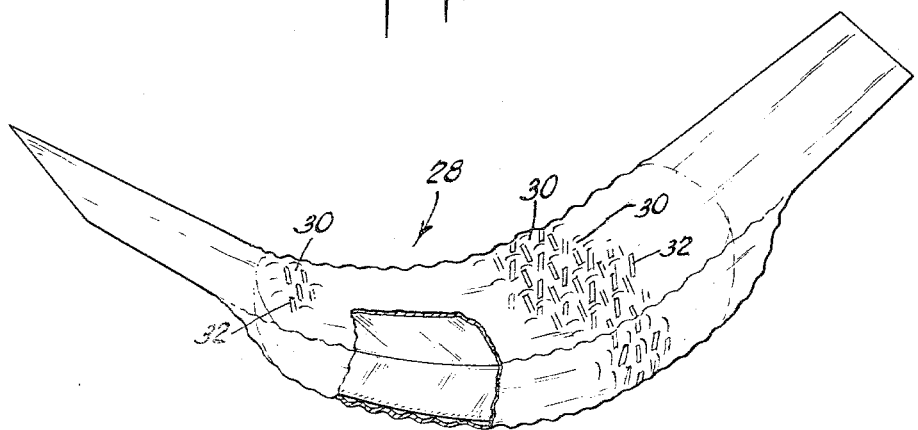
FIG. 10 is a perspective view of a sanitary napkin embodying another form of the invention and having a different fabric cover.

A sanitary napkin incorporating the invention, as illustrated in FIGS. 1 and 2, includes an elongated absorbent core or pad 10 of any suitable form or construction, such as a layer of comminuted wood pulp fibers two inches wide, eight inches long, three-quarters of an inch thick and weighing about 150 grains. A sheet of shrinkable plastic film 12 is positioned to cover the bottom and sides of the core. The core and film are enclosed within a non-woven fabric cover 14 which extends beyond the ends of the core to provide the usual attachment tabs 16. The napkin is arcuately shaped in the direction of its length in a configuration approximating the configuration of the body area against which it is positioned in use. In use, the napkin is positioned with the inside of curvature against the body.

A suitable non-woven fabric cover for the napkin comprises a plurality of superposed fibrous webs, at least one of which contains relatively shrinkable fibers and at least one other of which contains relatively non-shrinkable fibers. The superposed webs are bonded together in a predetermined intermittent pattern of binder areas or lines to form the fabric. The fibrous webs may be of the type wherein the fibers are oriented predominately in one direction, they may be webs wherein the fibers are disposed at random, such as so-called isotropic webs, or they may be of other desired forms.

As illustrated in FIGS. 5–7, the non-woven fabric cover may be composed of a top web 18 containing non-shrinkable fibers and a bottom web 20 containing shrinkable fibers. The webs are bonded together by binder areas 22 which are in the form of a wavy line intermittent print pattern which extends across the width of the fabric. The shrinkable fibers in the bottom web are arrange to extend predominately in a direction transversely of the binder lines. After the webs are so bonded together, and after they are applied to the absorbent core portion of the napkin, they are subjected to a treatment which causes the bottom web containing the relatively shrinkable fibers to contract, but which does not materially shrink the relatively non-shrinkable fibers. The portions of the top web containing the relatively non-shrinkable fibers between the lines of bonding do not contract, but become puffed and distended and extend away from the plane of the web containing the shrinkable fibers in a series of waves or ripples 24 and which alternate with depressions or troughs 26, thereby imparting to the fabric and to the napkin a three-dimensional surface interest, and areas of high loft and bulkiness.

The non-woven fabric cover may be positioned around the absorbent core portion of the napkin of FIGS. 1 and 2 so that the waves or ripples 24 and associated troughs 26, which are present in the portion of the fabric covering the inside curved surface of the napkin, i.e., the body side, extend in a direction transversely of the core, thereby providing on the inner curved surface of the napkin a wavy or corrugated appearance as illustrated in FIG. 1. Alternatively, the fabric may be positioned on the core so that the waves and ripples and associated troughs extend lengthwise of the napkin. Other variations are, of course, within the inventive concept.

Since the napkin illustrated in FIGS. 1 and 2 is arcuately shaped in the direction of its length, the portion of the fabric on the inside of curvature, unless it conforms with the inner curved surface of the absorbent core, will be baggy and will not contact the inside surface of the core. This is undesirable, not only because it will detract from the appearance of the napkin, but because it will also affect functioning of the napkin and prove uncomfortable. Therefore, that portion of the fabric covering the inside curved surface of the absorbent core is shrunk while the remaining portions of the cover, including the portions covering the back and sides of the core and the portions extending beyond the ends of the core to form attaching tabs, are not shrunken or only slightly so.

The non-woven fabric applied to the core is so positioned with respect to the core that shrinking in the desired direction will be obtained. If it is desired to shrink the fabric transversely of the core, a fabric which shinks in that direction is used. If it is desired to shrink the fabric longitudinally of the core, a fabric which shrinks in that direction is used. And, if it is desired to shrink the fabric in a plurality of directions, a fabric having such shrink characteristics is used. Such directional shrinking of fabric may be obtained by orienting the shrinkable fibers in the web containing them predominately in the direction of the shrinking desired. The fabric employed in the embodiment illustrated in FIG. 1 is shrinkable along one axis.

When the cover is applied to the arcuately shaped core, the portion of the fabric covering the inside curved surface of the core, i.e., the portion of the fabric to be shrunk, is maintained in a relaxed condition during the shrinking treatment in order to permit shrinking. The remaining portions of the cover which are not subjected to the shrinking processing may be maintained under slight tension to resist shrinking.

Figure 11:
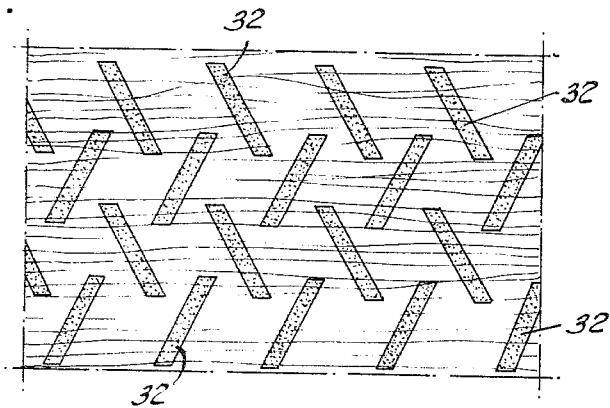
FIG. 11 is an enlarged plan view of a portion of the fabric cover of the napkin of FIG. 10 before processing and illustrating a predetermined pattern of binder thereon.

In FIG. 10 there is illustrated a preferred embodiment of the invention in the form of an arcuately shaped sanitary napkin 28 which includes an absorbent core and a non-woven fabric associated with the core in the manner described above in connection with the napkin illustrated in FIG. 1. However, the non-woven fabric in this embodiment has a different surface configuration in the shrunken portion covering the inside curved surface of the napkin. This non-woven fabric cover has a surface pattern in the form of square or diamond shaped hills and hummocks 30 which impart a pillow-like effect to the fabric. This may be achieved, as illustrated in FIG. 11, by applying the binder to the superposed relatively shrinkable fibrous web and the relatively non-shrinkable fibrous web in an intermittent pattern in the form of series of angularly disposed, rectangular shaped areas 32 arranged in alternating relationship with respect to each other. When a non-woven fabric cover having fibrous webs bonded in this manner is subjected to heat to cause the relatively shrinkable fibrous web to contract, the portions of the relatively non-shrinkable fibrous web between the binder areas are caused to distent and extend from the plane of the shrinkable fibrous web in the referred to pillow-like form. As in the embodiment illustrated in FIG. 1, the portion of the cover covering the inside of curvature of the napkin, i.e., the body side of the napkin, is shrunk while the remaining portions are unshrunk or relatively unshrunk. There may, however, be some degree of shrinkage in portions of the fabric adjacent to the portion covering the inside of curvature as, for example, the portions covering the sides of the napkin. Since it is desired to shrink selective portions of the fabric by limiting application of heat to those portions which are to be shrunk, the remaining portions of the cover are shielded, or the heat otherwise prevented from reaching the remaining portions so essentially no shrinking takes place in those portions.

Figure 12:
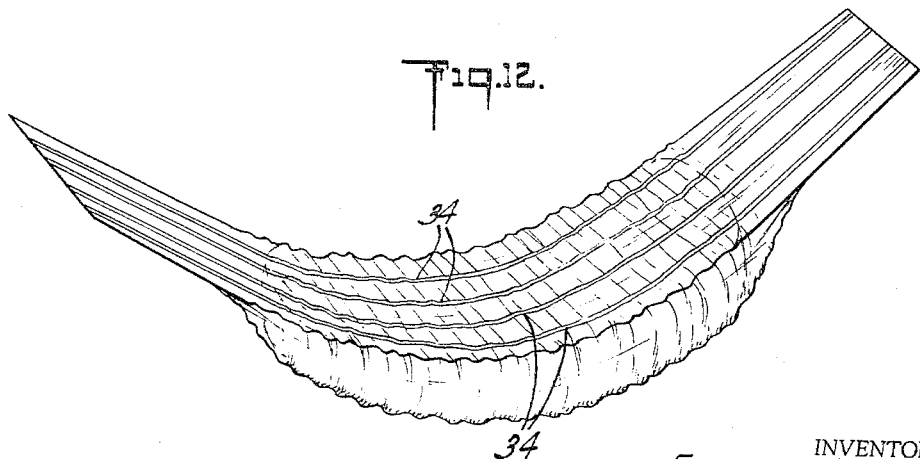
FIG. 12 is a perspective view of a sanitary napkin embodying another form of the invention.

In FIG. 12 there is illustrated another embodiment of the invention wherein the non-woven fabric cover for an arcuately shaped napkin is provided with a series of spaced, parallel strands or threads 34 shrinkable filaments which extend in a lengthwise direction with respect to the absorbent core and which are positioned in the portion of the non-woven fabric which will cover the curved inside surface of the napkin. The filaments may extend the entire length of the cover from tab end to tab end, as illustrated, or they may be as long as the core portion of the napkin, or even somewhat shorter, as desired. The non-woven fabric in this form of the invention does not require shrinkable fibers in the webs from which the cover is formed, as in the preceding embodiments. Essentially any type of non-woven fabric used heretofore is satisfactory. The shrinkable filaments, which may be 400 denier type 9601 Revana, a vinylidene chloride copolymer microtape, 0.025 inch wide, obtained from Dow Chemical Company, are secured to the non-which may be 400 denier type 9601 Rovana, a vinylidene woven fabric cover in a continuous or intermittent manner, as desired, by any suitable means such as by an adhesive, with the shrinkable filaments overlying the inside of curvature of the napkin. After the cover is so associated with the core, heat is applied to the shrinkable strands causing them to contract and to induce the portion of the non-woven fabric to which they are bonded to pucker and to fit into conforming engagement with the curved body side of the napkin.

In FIGS. 15–17 there is illustrated a still further embodiment of the invention in the form of a sanitary napkin which not only has an arcuate configuration in its lengthwise direction, but which also is narrower in its center portion 36 than at its ends 38. Conformability of a non-woven fabric to an absorbent core having such a configuration may be achieved by using a non-woven fabric containing shrinkable fibers of the type employed in the embodiment illustrated in FIGS. 1 and 10, and by also bonding a series of spaced parallel strands of shrinkable threads or filaments 40 to the non-woven fabric with the threads or filaments extending in a direction transversely of the absorbent core portion of the napkin. The non-woven fabric is so arranged with respect to the core that the fabric will shrink and pucker both lengthwise and transversely of the core. When a non-woven fabric of this construction is placed upon an absorbent core having the configuration illustrated in FIGS. 15 and 16, and the portions of the fabric covering the curved portions of the napkin are exposed to heat, the cover shrinks in the direction of the length of the absorbent core and the shrinkable filaments or threads extending transversely of the absorbent core shrink to cause the cover to contract in a transverse direction. In this manner, the cover may be made to conform with an absorbent pad which is of a non-planar configuration in more than one direction. The same results may be achieved by omitting the shrinkable filaments and instead using a fabric containing shrinkable fibers which are so oriented in the fabric as to provide shrinkage in both a transverse and longitudinal direction.

The extent to which the fibers and filaments used in the fabric cover shrink is affected by a number of factors which permit controlled shrinkages as desired for various end results. For example, the degree of shrinkage is affected by the type of shrink elements used, whether they be fibers or filaments, the amounts of shrink elements present, the extent to which the shrink elements may be shrunken, and the shrink tension of the element (i.e., the amount of force a shrinkable element exerts while it shrinks).

The degree of shrinkage is also affected by the resistance the shrink elements must overcome. Resistance to shrinkage is determined by such factors as the size, weight and densities of the fibers to be shrunk, the amount and type of binder used to bind the fibrous webs together to form the fabric, the pattern of the binder and the area of binder coverage. All of the factors may be controlled and predetermined to provide articles of varying forms and characteristics, as desired.

The shrinkable fibers and filaments may be caused to contract by chemical and/or physical means. It is preferred to use heat-shrinkable fibers and filaments.

The fibers which may be used in the relatively shrinkable web may be selected from a large group and include the vinyl polymer fibers, such as "Vinyon"; polyvinyl chloride fibers, such as those designated "Rhovyl"; polyvinylidene chloride-vinyl chloride copolymer, such as "Saran"; polyesters such as "Dacron" and "Kodel"; polyolefins, such as low, medium and high density polyethylenes and the like. Such fibers may be provided to have heat-shrinkable characteristics, such as that achieved by axially orienting the fibers in accordance with known techniques, and then may be shrunk by subjecting the fibers to heat. A number of the foregoing shrinkable materials may be obtained in the form of filaments or ribbons for use in the practice of those embodiments of the inventions as illustrated in FIGS. 12 and 15.

Many potentially shrinkable fibers are hydrophobic and fibrous webs containing such fibers may tend to repel fluid, or to reduce the liquid perviousness of the web. In that event, and if liquid perviousness is desired in the article, a small amount of wetting agent may be incorporated into the web containing the fibers or into the non-woven fabric which contains the web.

Fibers, filaments and strands of the above and similar materials having different shrink characteristics are available and the extent to which they shrink may be modified or controlled by appropriate selection of conditions which cause them to shrink, as for example, by controlling the temperature of the heat applied which causes shrinking or by varying the time of exposure to the heat.

The relatively unshrinkable fibers may also be selected from a larger group. Such fibers include natural fibers, such as cotton or linen; synthetic fibers, such as regenerated cellulose; cellulose esters, such as the acetate and triacetate; polyamides, such as nylon, and the like.

The above fibers are representative of the types which may be used in making the non-woven fabrics incorporated in the invention and it is to be appreciated that the inventive concept is not to be limited thereto. Essentially any synthetic thermoplastic fiber may be so manufactured or processed to impart some shrinkage properties to it and consequently essentially any such synthetic fiber may be used. Fibers having different degrees of shrinkage are available. By way of example, "Rhovyl" exhibits shrinkages up to about 60%; "Verel" up to about 50%; "Dacron" up to about 45%; and "Dynel" up to about 50%. By controlling temperature conditions, degree of shrinkage may be varied. Other fibers containing greater or lesser degrees of shrinkages are, of course, useful where greater or lesser effects are desired. Generally, however, fibers with percentage shrinkages of from about 20% to 75% have been found satisfactory with a range of from 35% to about 65% being preferred.

The fibers must be in a relaxed condition during the shrinking process so that they can contract. Their degree of shrinkage may be modified and controlled by placing them under restraint.

Since the effect desired is obtained in the non-woven fabric by the difference in heat-shrinking properties of the fibrous webs, in that form of the invention such effect may be obtained by using two heat-shrinkable fibers, provided the difference in heat-shrinking properties is sufficient, or if the heat-shrinkable properties of one may be developed without developing the heat-shrinkable properties of the other. The important factor is the differential in shrinking which is developed under the conditions to which the webs are exposed during the heat treatment.

It is not required that each fibrous web be composed of only one type of fiber. Blends and mixtures may be used in both the non-shrinkable web and in the shrinkable web, so long as the desired heat-shrinkable properties can be developed. For example, in the case of the heat-shrinkable web, it has been found that as little as about 15% by weight of heat-shrinkable fibers may be present and still develop sufficient heat shrinkability.

The percentage of the heat-shrinkable fibers with respect to the total weight of all the webs in the non-woven fabric is also a factor to be considered to insure the development of the desired fabric configuration. As little as about 5% by weight of the heat-shrinkable fibers on an over-all fabric basis has been found satisfactory; about 16% to about 50% by weight is preferred. Greater than 50% by weight may be used where special effects are desired.

The fibers are preferably of textile staple or equivalent length, or at least cardable, e.g., from about ½ inch to about 3 inches in average length. Shorter fibers, down to about 3/16 inch average length may be added in various proportions to comprise about 50% by weight of the web, or even may comprise the entire web, particularly where the original method of web formation involves a fluid deposition of fibers, such as in a paper-making process, or in air deposition techniques. In such fluid deposition processes, average fiber lengths down to about 3/16 inch are preferred to the extremely short fiber lengths of down to about 1/16 inch and even below used in making paper. When the fluid process is a paper-making process, the fibers should be in a relatively unbeaten form.

The length of the shrinkable fibers should be sufficient to bridge the gap between two adjacent binder areas. The shrinkable fibers will then be bonded in at least two points along their lengths so that they will satisfactorily transmit buckling or puffing stresses to the unshrinkable fibers. The lengths of the shrinkable fibers should therefore be greater than the interbinder spaces and normally are at least 1½ and preferably at least two times the space between binder areas. The space between binder areas selected will depend upon many factors such as the binder area selected, the binder itself, the use of the bonded fabric, etc.

The space between binder areas will also depend to a considerable extent upon the percent binder coverage of the non-woven fabric since the greater the percent binder coverage, the less the space between binder areas will be. The total surface coverage of the binder areas or lines should not desirably exceed about 35% of the total surface of the non-woven fabric. However, the binder coverage may be substantially greater than 35%. Normally, the greater the binder surface coverage, the less dramatic is the surface interest which is developed on the non-woven fabric. The individual binder pattern areas or lines may be increased in size or thickness; there may be a greater number of binder pattern areas or lines per unit area, or a binder may be employed which migrates or spreads on the non-woven fabric after being applied to thus cover a greater percentage of the surface area of the fabric, e.g., up to 80 or 90% coverage.

The denier of the synthetic fibers used in forming the webs is preferably in the range of the approximate thickness of the natural fibers noted above and fibers having deniers in the range of from about 1 to about 3 are preferred. However, where greater opacity or greater covering power is desired, deniers of down to about ¾ or even about ½ may be employed. Where desired, deniers of up to 10, 15, or higher, may be used. The minimum and maximum denier are, of course, dictated by the desires or requirements for producing a particular web or non-woven fabric, and by the machines and methods for producing the same.

The weight of the individual fibrous webs from which the non-woven fabric is formed may be varied within relatively wide limits, depending upon the requirements of the finished product. A single, thin web of fibers, such as produced by a card, may have a weight of from about 40 to about 200 grains per square yard. The minimum weight of the non-woven fabric cover for a sanitary napkin should be about 150 grains per square yard and the maximum weight about 300 or more grains per square yard. Within the more commercial aspects of the present invention, however, fabrics weighing about 280 grains per square yard are preferred. These weights are measured prior to shrinking of the fabric and will increase subsequent to shrinking.

The non-woven fabric may comprise a single web containing shrinkable fibers or filaments. However, at least two webs are preferred. Three, four, five or more webs, in any desired arrangement may also be used. The web containing the shrinkable fibers may include non-shrinkable fibers, or may be composed entirely of shrinkable fibers. For example, in a non-woven fabric containing five card webs, the middle web may be composed entirely of shrinkable fibers, such as Rhovyl 55 fibers, the amount of the shrinkable fibers constituting about 13.5% of the weight of the fabric. In this form, it is not required to make a complete fiber blend of shrinkable and non-shrinkable fibers in lap form.

Further, only portions of the non-woven fabric may be shrinkable while the other portions are not. This may be achieved by limiting the shrinkable fibers to those portions where shrinking is desired.

The fibrous web containing the shrinkable fibers may be bonded to the relatively non-shrinkable fibrous web with any suitable binding agent such as regenerated cellulose; vinyl resins such as Geon 537 sold by Goodrich Chemical Company; polyvinyl alcohol; acrylic resins such as ethyl acrylate, methyl methacrylate, methyl acrylate, butyl methacrylate; butadiene resins such as butadiene-acrylonitrile, e.g., Tylac 5040 sold by International Latex Corporation; other synthetic rubbers; urea resins; aldehyde resins; epoxy resins; cellulose derivatives; starches; gums; casein; and other binding agents known in the art of making non-woven fabrics.

The binding agents may be applied in any suitable form such as emulsions, solutions, dispersions, powders and the like. If desired, thermoplastic bonding may be obtained where thermoplastic fibers are used by the application of heat and pressure.

The amount of binder which may be added may be varied within relatively wide limits, depending upon the specific binder employed and the weight, type and thickness of the non-woven fabric. The amount of binder may range from as low as about 1 percent by weight to about 12 percent by weight based upon the weight of the dry webs being bonded, whereas in other instances as high as from about 15 to 20 percent by weight has been found desirable.

The binder may be applied to the webs in any desired predetermined pattern of spaced binder areas or lines which bond the fibers passing through these areas or lines into a staple, self-sustaining relationship. The areas may be in the form of circles, annuli, ovals, ellipses, triangles, rectangles, squares, diamonds, or in combinations thereof. If the binder is in the form of lines, the lines may extend across the webs at any desired angle; they may be parallel or cross each other; they may be continuous or discontinuous, straight, curved, sinuous or irregularly wavy.

The following are illustrative examples of non-woven fabrics used in the practice of the invention.

*Example I*

A card web weighing 90 grains/sq. yd. and comprising 1.5 denier, 1 9/16 inch staple length viscose rayon fibers is plied with a second card web weighing 100 grains/sq. yd. and comprising 42% by weight of 1.8 denier, 2 inch staple length Rhovyl 55 fibers (heat-shrinkable polyvinyl chloride fibers made by Societe Rhovyl) and 58% by weight of 1.5 denier, 1 9/16 inch staple length viscose rayon fibers. The combined web is plied with a third card web weighing 90 grains/sq. yd. and comprising 1.5 denier, 1 9/16 inch staple length viscose rayon fibers with the ply containing the Rhovyl 55 fibers in the center of the composite. The webs are all oriented so that the fibers in the webs extend in the same direction. The composite is wetted with water to a moisture pick-up of about 170% by weight, based upon the dry weight of the webs. The wetted webs are immediately print bonded (before any substantial loss of moisture content), on a Rotogravure print unit having cross hatch print pattern as disclosed in U.S. Patent No. 2,705,687, and as illustrated in FIG. 11, in which each segment of the pattern is .032 inch in width and .004 inch deep. The binder agent is cellulose xanthate, 6% caustic, 6½% cellulose, falling ball viscosity—60 seconds. The webs are then immediately introduced into a bath containing 20% sodium sulfate ($Na_2SO_4$) and 4% sulfuric acid ($H_2SO_4$), vacuum extracted and washed with water to remove all traces of salt and acid. The webs, which contain about 20 grains of regenerated cellulose binder per square yard, are then dried under tension on conventional dry cans at a temperature of about 250° F. to form the non-woven fabric. The fabric, after shrinking, will have the configuration illustrated in FIG. 10.

*Example II*

The same procedure as set forth in Example I is followed except that the Rotogravure print unit has a print pattern in the form of spaced, wavy lines, four lines per inch, with the lines being 0.018 inch wide and 0.004 inch deep. The lines of binder extend across the oriented fibers. The fabric, after shrinking the shrinkable fibers, will have the configuration illustrated in FIGS. 1 and 2.

*Example III*

A card web weighing 90 grains/sq. yd. and comprising 1.5 denier, 1 9/16 inch staple length viscose rayon fibers is plied with a second card web weighing 100 grains/sq. yd. and comprising 42% by weight of 3.0 denier, 2 inch staple length Profax fibers (heat-shrinkable polypropylene fibers made by Hercules Chemical Company) and 58% by weight of 1.5 denier, 1 9/16 inch staple length viscose rayon. The combined webs are plied with a third card web weighing 90 grains/sq. yd. and comprising 1.5 denier, 1 9/16 inch staple length viscose rayon fibers with the ply containing the Profax fibers in the center of the composite. As in Example I, the webs are oriented in the same direction. The composite is wetted with water to a moisture pick-up of about 170% by weight, based on the dry weight of the webs. The wetted webs are immediately print bonded (before any substantial loss of moisture content), on a Rotogravure print unit having a print pattern as disclosed in U.S. Patent No. 3,009,823 in which each segment of the pattern is 0.023 inch in width at the widest portion, 0.016 inch in width at the ends and .004 inch deep. The binder is Tylac 5040 (a carboxylated butadiene-acrylonitrile containing approximately 45% solids and supplied by International Latex Corporation). The webs, which have about 45 grains of binder solids per square yard, are then dried under tension on conventional dry cans at temperatures of about 250° F. to form the non-woven fabric.

*Example IV*

To card webs, each weighing 90 grains/sq. yd. and composed of 1.5 denier, 1 9/16 inch staple length viscose rayon fibers are plied together with the webs oriented so the fibers extend in the same direction. Four strands of 400 denier, type 9601 Rovana microtape (heat-shrinkable strands, 0.025 inch wide of vinylidene chloride copolymer obtained from Dow Chemical Company) are placed one-half inch apart on top of the plied webs so that the strands will be positioned in that portion of the non-woven fabric formed from the webs which will cover the concave surface of the napkin. The strands are parallel and extend in the direction of the fibers in the webs. A third card web of the fibers is then placed on top of the Rovana strands with its fibers oriented in the same direction as the fibers in the two plied web. The composite containing the strands is wetted with water to a moisture pick-up of about 170°, based upon the dry weight of the webs. The wet webs are immediately print bonded as in Example II. The binder is a polyvinyl acetate resin emulsion obtained from the National Starch Corporation under the designation 78–3206. After drying, the binder not only binds the webs together, but also secures the Rovana strands in place between the webs. The fabric is then applied to the core portion of the napkin, in the manner illustrated in FIG. 12, with the Rovana strands on the top surface thereof and extending in the direction of the length of the core.

*Example V*

Three card webs, each weighing 90 grains/sq. yd. and composed of 1.5 denier, 1 9/16 inch staple length, viscose rayon fibers are plied together with the webs oriented so the fibers extend in the same direction. The plied webs are wetted with water to a moisture pick-up of about 170%, based upon the dry weight of the webs. The wetted webs are immediately print boded as in Example I.

The adhesive binder is a polyvinyl acetate resin emulsion obtained from the National Starch Corporation under the designation 78–3206. The adhesive is then dried to form a non-woven fabric. Four strands of 400 denier, type 9601 Rovana microtape are positioned parallel and ½ inch apart on top of the non-woven fabric so that the strands will be in the portion of the fabric which will cover the concave surface of the napkin. The yarns extend in the direction of the fibers in the fabric. After the Rovana strands are placed on top of the fabric, they are print bonded on the Rotogravure print unit with the same adhesive. The adhesive is then dried, thereby securing the strands to the fabric. The fabric is then applied to the core portion of the napkin, in the manner illustrated in FIG. 12, with the Rovana strands on the top surface thereof and extending in the direction of the length of the core. In this form of the invention, the strands will be exposed on the outer surface of the napkin, whereas in the fabric of Example IV, the strands will be positioned beneath a web of fibers.

*Example VI*

A non-woven fabric is prepared in accordance with Example I. Six to eight strands of 400 denier, type 9601, Rovana microtape are placed parallel and ½ inch apart on top of the non-woven fabric so that the strands will be in that portion of the fabric which will cover the concave surface of the napkin. The strands are of sufficient length to extend across the width and adjacent sides of the napkin. They are arranged with respect to the non-woven fabric so that they extend in a direction transversely of the fiber orientation in the webs, and are bonded as described in Example V, with the lines of binder extending across the strands and bonding the strands to the fabric at spaced intervals. The non-woven fabric so formed is then applied to the shaped absorbent core portion of the napkin with the shrinkable fibers in the fabric extending in the direction of the length of the core and with the Rovana strands extending across the core. This fabric is shrinkable both in the direction of the length of the napkin and also transversely thereof, as illustrated in FIGS. 15 and 16.

A sanitary napkin incorporating the invention may be made in accordance with the following method on the apparatus illustrated in FIG. 18. Bleached sulfite wood pulp board 42 is fed from a supply roll 44 into a comminuting mill 46 which disintegrates the board to form individualized wood pulp fibers. The fibers are laid down in the form of a continuous bulky, absorbent bat 48 of the type illustrated in FIG. 18b, on an endless belt moving horizontally below the mill. The bat is approximately two inches wide, three-quarters of an inch thick and has a density of about 150 grains per eight inch length. As described in co-pending application Serial No. 223,488, an axially-oriented polyvinyl chloride film 50, three-quarters of an inch thick and four inches wide, such as the type available from the Goodyear Tire and Rubber Company under the designation Vitafilm ST is fed from a supply roll 52 positioned above the endless belt on which the continuous bat of wood pulp fibers is moving below past a roll-type adhesive applicator 54 which applies a light coating of adhesive, such as Rhoplex HA-8, sold by Rohm & Haas Corporation, to one surface of the film.

Directly after being coated with the adhesive and while the adhesive is still wet, the film is positioned on top of the continuous bat 48 of wood pulp fibers with the adhesive-coated side of the film in contact with the bat to which it becomes bonded. The film is positioned to cover the top surface and both sides of the bat, as illustrated in FIGS. 18c and 19c, by suitable folding devices.

The bat with the oriented plastic film adhesively bonded to it then proceeds to a cutting device 56 which severs the bat and the film into individual film-covered pads 58 approximately eight inches long. These pads form the absorbent core portion of the napkin. After cutting, the individual pads are positioned in spaced relationship on top of a horizontally moving, continuous length of the non-woven fabric 60 containing shrinkable fibers, such as that prepared in accordance with Example I, which is fed from a supply roll 62 and which is of sufficient width, e.g., six and one-half inches wide, to be folded around the spaced, film-covered pads with the longitudinal edges of the non-woven fabric disposed in overlapping relationship on top of the pads, i.e., on the same side of the pad as the plastic film. This is the side of the napkin which is placed away from the body when the napkin is worn.

The covered spaced pads pass through a turnover device 64 which inverts the cover and pads to a position with the film side of the pads down. The spaced pads enclosed within the non-woven fabric cover next pass to a cutting and stacking device 66 wherein the portions of the non-woven fabric extending between adjacent ends of adjacent pads are cut approximately midway between the pad ends, thus forming flat sanitary napkins 68 of the conventional type having an absorbent core enclosed within a non-woven fabric cover whose ends extend beyond the ends of the core to form attachment tabs 70. In the cutting and stacking device, the attachment tabs are also folded around against the face of the pads on which the edges of the cover are overlapped and as the pads leave the cutter and stacker, they are rearranged from a horizontal position to a vertical position and are then placed into molds 74 which preform the napkins into the general shape desired and hold the napkins in such shape in their passage through a forming oven wherein selective portions of the shrinkable non-woven fabric cover are caused to shrink.

As illustrated in FIGS. 8 and 9, a typical preforming mold 74 for use in making an arcuately shaped napkin incorporating the invention may comprise a pair of spaced, arcuately shaped metal plates 76, 76 which define an arcuately shaped, napkin-receiving pocket 78 which is approximately of the configuration desired in the finished napkin. For a napkin having a pad eight inches long, the mold may have a radius of curvature of four inches on the inside of the mold. Further details regarding the mold and the manner in which the molds are associated in continuous relationship with an oven, as described below, are set forth in co-pending patent application Serial No. 223,488, whose disclosure is incorporated herein by reference.

The napkins so positioned in the molds are next moved into an oven 80 wherein the shrinkable fibers in the fabric cover are caused to shrink by the application of heat. In the oven, jets of hot air, at a temperature of about 350° F. are directed to the portion of the non-woven fabric covering the face of the napkin, i.e., the inside curved surface of the napkin, for a period of about five seconds. If a fabric of the type prepared in accordance with Example III is used, a temperature of about 400° C. is used where the time of exposure is about five seconds.

The hot air causes the portion of the fibrous web upon which it impinges to contract into conforming relationship with the curved surface of the napkin. In so doing, the fibrous web component of the non-woven fabric which is relatively non-shrinkable forms puffs 82 and becomes distended and extends away from the relatively shrinkable web in a pattern determined by the pattern of the applied binder. The napkins are then cooled. The portions of the non-woven fabric cover covering the sides and bottom of the absorbent pad and the portions extending forming the attaching tabs are shielded or unheated, or heated to a relatively lesser extent than the portions of the fabric covering the curved face of the pad and do not shrink appreciably. The portions of the cover on the back of the napkin and the portions forming the attaching tabs are shielded from the hot air by the face of the mold with which they are in contact. There may be some slight shrinkage of the portion of the fabric covering the sides of the napkin, but this can be minimized by appropriately directing the jets of hot air to the portion of the fabric to be shrunk and by cooling the molds after they leave the oven and before they are returned for another cycle.

Although several specific examples of the inventive concept have been described, and more particularly with respect to a curved sanitary napkin, the same should not be construed as limited thereby, nor to the specific substances or constructions mentioned therein but to include various other equivalent substances and constructions as set forth in the claims appended hereto. It is to be understood, therefore, that suitable changes, modifications and variations may be made without departing from the spirit and scope of the invention.

What is claimed is:

1. A preformed body suitable for padding or for absorbing fluid comprising an inner core of fibrous material having a non-planar portion and a fibrous cover on said core, said cover comprising relatively nonshrinkable fibers having spaced elongated elements of a shrinkable material bonded therein in the area overlying said non-planar portion of said core, said elements being in a shrunken state wherby said elements are in conforming relationship to the nonplanar portion of said core and thereby also said cover is stabilized in intimate contact with and in conforming relationship to the non-planar portion of said core.

2. A preformed body in accordance with claim 1 wherein said fabric cover is a non-woven fabric.

3. A preformed body in accordance with claim 1 wherein said elongated elements are oriented in said fabric cover with their longitudinal axes extending in more than one direction.

4. A preformed body in accordance with claim 1 wherein said fabric has between said spaced, elongated elements portions of high loft extending outwardly from the non-planar portion of said core.

5. A preformed body in accordance with claim 1 wherein the non-planar configuration of said core is an arcuate configuration.

6. A preformed body in accordance with claim 1 wherein said elements are of a heat shrinkable material and said elements are in a heat shrunken state.

7. A preformed body suitable for padding or for absorbing fluid comprising an inner core of fibrous material having a non-planar portion and a fabric cover on said core, said cover including a portion comprising a layer of fibrous material containing fibers of a shrinkable material and elongated elements of a shrinkable material secured to said layer, the direction of shrinkability of said fibers and said elements being different, said portion of said cover overlying the non-planar portion of said core, said fibers and elements being in a shrunken state whereby said fabric cover is stabilized in intimate contact with and conforms to the non-planar portion of said core.

8. A preformed body suitable for padding or for absorbing fluid comprising an inner core of fibrous material having a non-planar portion and a fabric cover on said core, said cover comprising at least two layers of a fibrous material intermittently bonded together in a predetermined pattern of spaced, elongated binder areas, at least one of said layers containing fibers of a shrinkable material in the area overlying said non-planar portion of said core, said fibers being in a shrunken state whereby said layer is in conforming relationship to the nonplanar portion of said core and thereby also said cover is stabilized in intimate contact with and in conforming relationship to the non-planar portion of said core.

9. A preformed body in accordance with claim 8 wherein the fibers in said layer containing the fibers in a shrunken state are oriented predominately in one direction.

10. A preformed body in accordance with claim 9 wherein said oriented fibers extend in a direction which is out of alignment with the longitudinal axis of said binder areas.

11. A preformed body in accordance with claim 9 wherein said oriented fibers extend in the direction in which said core is non-planar.

12. A preformed body suitable for padding or for absorbing fluid comprising an inner core of fibrous material having a non-planar portion and a fabric cover on said core, said cover having spaced elongated elements of a shrinkable material secured thereto in the area overlying said non-planar portion of said core, said elements being in a shrunken state whereby said elements are in conforming relationship to the nonplanar portion of said core and thereby also said cover is stabilized in intimate contact with and in conforming relationship to the non-planar portion of said core.

13. A preformed body in accordance with claim 12 wherein said elements are in the form of spaced strands.

14. A preformed body in accordance with claim 12 wherein said elements are in the form of strands of a shrinkable plastic.

15. A sanitary napkin comprising an inner core of absorbent fibrous material having an arcuate portion and a liquid pervious fabric cover on said core, said cover comprising at least two layers of fibrous material intermittently bonded together in a predetermined pattern of spaced binder areas, at least one of said layers containing fibers of a shrinkable material in the area overlying the arcuate portion of said core, at least one other of said layers containing fibers of a relatively non-shrinkable material in the area overlying said arcuate portion of said core, said fibers of a shrinkable material being in a shrunken state whereby said cover is stabilized in intimate contact with and conforms to said arcuate portion of said core, the portions of said fibrous layer containing fibers of a relatively non-shrinkable material which are not bonded to said fibrous layer containing said shrunken fibers extending outwardly therefrom in areas of high loft determined by the pattern of spaced binder areas.

References Cited by the Examiner

UNITED STATES PATENTS

| | | | |
|---|---|---|---|
| 2,245,289 | 6/1941 | Muller. | |
| 2,607,104 | 8/1952 | Foster | 156—85 |
| 2,802,764 | 8/1957 | Slayter et al. | 156—84 |
| 2,878,628 | 3/1959 | Curry | 53—30 |
| 2,900,980 | 8/1959 | Harwood | 128—290 |
| 2,964,040 | 12/1960 | Ashton et al. | 128—290 |
| 3,047,444 | 7/1962 | Harwood | 128—290 |
| 3,095,878 | 7/1963 | Bassett | 128—290 |

FOREIGN PATENTS 796,868    6/1954    Great Britain.

RICHARD A. GAUDET, *Primary Examiner.*

JORDAN FRANKLIN, *Examiner.*